United States Patent [19]

Eon et al.

[11] Patent Number: 5,251,441
[45] Date of Patent: Oct. 12, 1993

[54] FLUID COUPLING

[75] Inventors: Christian Eon, Nevers; Patrice Levassort, Marzy Nevers, both of France

[73] Assignee: Sime Industrie, La Guerche sur l'Aubois, France

[21] Appl. No.: 836,542

[22] Filed: Feb. 18, 1992

[30] Foreign Application Priority Data

Mar. 13, 1991 [FR] France ................. 91 03031

[51] Int. Cl.$^5$ ............................... F16D 33/00
[52] U.S. Cl. ......................... 60/352; 60/357; 60/330
[58] Field of Search .............. 60/330, 348, 352, 338, 60/357, 358, 359, 360

[56] References Cited

U.S. PATENT DOCUMENTS

| | | | |
|---|---|---|---|
| 2,133,029 | 10/1938 | Kugel | 60/359 |
| 2,245,684 | 6/1941 | Kiep | 60/352 |
| 2,423,812 | 7/1947 | Karl et al. | 60/348 |
| 2,987,887 | 6/1961 | Fowler | 60/359 |
| 3,999,385 | 12/1976 | Hoeller et al. | 60/330 |
| 4,581,892 | 4/1986 | Ahrens et al. | 60/357 X |
| 4,761,952 | 8/1988 | Holler | 60/330 |
| 4,928,486 | 5/1990 | Despres | 60/338 |

FOREIGN PATENT DOCUMENTS

| | | | |
|---|---|---|---|
| 3522174 | 5/1986 | Fed. Rep. of Germany . | |
| 1225225 | 2/1960 | France | 60/330 |
| 2298037 | 1/1980 | France . | |
| 1416023 | 9/1985 | France . | |
| 0129931 | 8/1982 | Japan | 60/330 |

OTHER PUBLICATIONS

Power and Works Engineer, Dec. 1939.

*Primary Examiner*—Edward K. Look
*Assistant Examiner*—Hoang Nguyen
*Attorney, Agent, or Firm*—Young & Thompson

[57] ABSTRACT

A fixed fluid capacity fluid coupling comprises a main bypass chamber and an auxiliary bypass chamber. The output wheel includes at least one hole and an offtake channel connecting the working circuit to the auxiliary bypass chamber uses this hole. Applications include fixed fluid capacity fluid couplings for driving high-inertia loads.

11 Claims, 2 Drawing Sheets

FLUID COUPLING

BACKGROUND OF THE INVENTION

1. Field of the Invention

The present invention is generally concerned with fluid couplings.

Generally speaking, fluid couplings comprise two members namely an impeller wheel forming a pump and an output wheel forming a turbine. Disposed face-to-face in a casing, these members define between them a working circuit containing fluid.

The present invention is more particularly directed to the case where the working circuit contains a fixed quantity of fluid at all times.

2. Description of the Prior Art

Fluid couplings of this type are used among other things to drive a load, being inserted between the load and the motor, and their function is firstly to run up to load progressively in order to protect the motor and secondly to introduce advantageous flexibility into the operation of the system.

In practice the drive torque available at the output shaft depends on the fluid capacity and the speed.

The fluid capacity in turn depends in particular on the power to be transmitted under steady state conditions.

Given the particular fluid capacity, the drive torque on starting up can be too high to achieve the required progressive operation, especially if the load to be driven has very high inertia, as can be the case with some conveyor belts, for example.

If nothing is done to prevent it, this starting torque is usually in a ratio in the order of 1.7 to 1.8 to the normal resisting torque under steady state conditions.

To alleviate this difficulty and achieve a more progressive start it is usual practice to provide a bypass chamber coupled to the working circuit and forming an annulus around the axis of the system. This is adapted to limit the quantity of fluid actually present in the working circuit on starting up and therefore the fluid capacity at this time, by temporarily diverting a significant proportion of the fluid.

In practice the communication between the working circuit and the bypass chamber comprises at least one distinct offtake channel and at least one return channel with at least one calibrated nozzle means on the return channel to achieve the required progressive operation.

These arrangements are usually satisfactory.

They make it possible to reduce the ratio between the drive torque and the normal resisting torque under steady state conditions to a value in the order of 1.5 to 1.7 (or even 1.3 to 1.5 if the bypass chamber is sufficiently long and the calibrated nozzle means of the return channel are appropriately specified).

They may still be unsatisfactory, however, in some cases at least, when it is desirable for the ratio to be reduced to a value in the order of 1.2, for example.

To overcome this problem it has previously been proposed to add to the first bypass chamber or main bypass chamber a second bypass chamber referred to hereinafter for convenience only as the auxiliary bypass chamber.

This is the case, for example, in the German patent application No 35 22 174.

However, in this document the offtake channel connecting the working circuit to the auxiliary bypass chamber uses the gap between the outside peripheries of the impeller wheel and the output wheel.

A first consequence of this is that the offtake of fluid is due to centrifugal force which requires that the rotation speed is sufficiently high and therefore involves some time-delay.

Another consequence is that the auxiliary bypass chamber must necessarily extend at least in part radially beyond the outer peripheral diameter of the working circuit, to the detriment of the overall diameter of the system and its inertia.

It is known to provide holes in the output wheel to balance the pressure on its opposite sides.

A general object of the present invention is an arrangement which further uses these holes to provide a very simple way to avoid the above problems.

SUMMARY OF THE INVENTION

The present invention consists in a fixed fluid capacity fluid coupling comprising in face-to-face relationship in a casing two members defining between them a working circuit containing a fluid, namely an impeller wheel which forms a pump and an output wheel which forms a turbine, there being connected to the working circuit in order to reduce the quantity of fluid in it on starting up two bypass chambers extending annularly around the axis of the system, namely a first or main chamber and a second or auxiliary chamber, in which coupling the output wheel comprises at least one hole and an offtake channel coupling the working circuit to the auxiliary bypass chamber uses said hole.

In practice this is a hole usually provided for pressure balancing purposes.

Be this as it may, the hole acts as an intermediary between the inside peripheral diameter of the output wheel and therefore of the working circuit and the outside peripheral diameter of the latter, the offtake of fluid from the working circuit to the auxiliary bypass chamber resulting to a much greater degree, in a coupling in accordance with the invention, from the vortex movement occurring in service in the working circuit than from centrifugal force.

This offtake of fluid can therefore and advantageously occur more quickly.

The linear speed of the vortex is maximal at this time, and frequently in the order of 50 m/s.

Moreover, because of the intermediate location of the hole(s) for offtake of fluid the auxiliary bypass chamber can advantageously, if required, be contained entirely within an overall volume whose diameter is at most of the same order of magnitude as the outside peripheral diameter of the working circuit, to the benefit of the overall diameter and the inertia of the system.

A fluid coupling is known from French patent application FR-A-2 298 037 whose output wheel comprises in one embodiment at least one hole through which fluid passes.

In reality, however, this French patent application is concerned with a variable fluid capacity coupling and not with a fixed fluid capacity coupling.

The hole in the output wheel of the coupling in this embodiment is operative near its periphery to evacuate fluid and not to fill the working circuit during operation.

Finally, the axis of this coupling must necessarily be disposed vertically when in operation.

There is therefore in actual fact no commonality between this coupling and the coupling in accordance with the invention which, being a fixed fluid capacity coupling, is suited to a different configuration and a different mode of operation.

The features and advantages of the invention will emerge from the following description given by way of example with reference to the appended diagrammatic drawings.

DETAILED DESCRIPTION OF THE INVENTION

Figure 1:
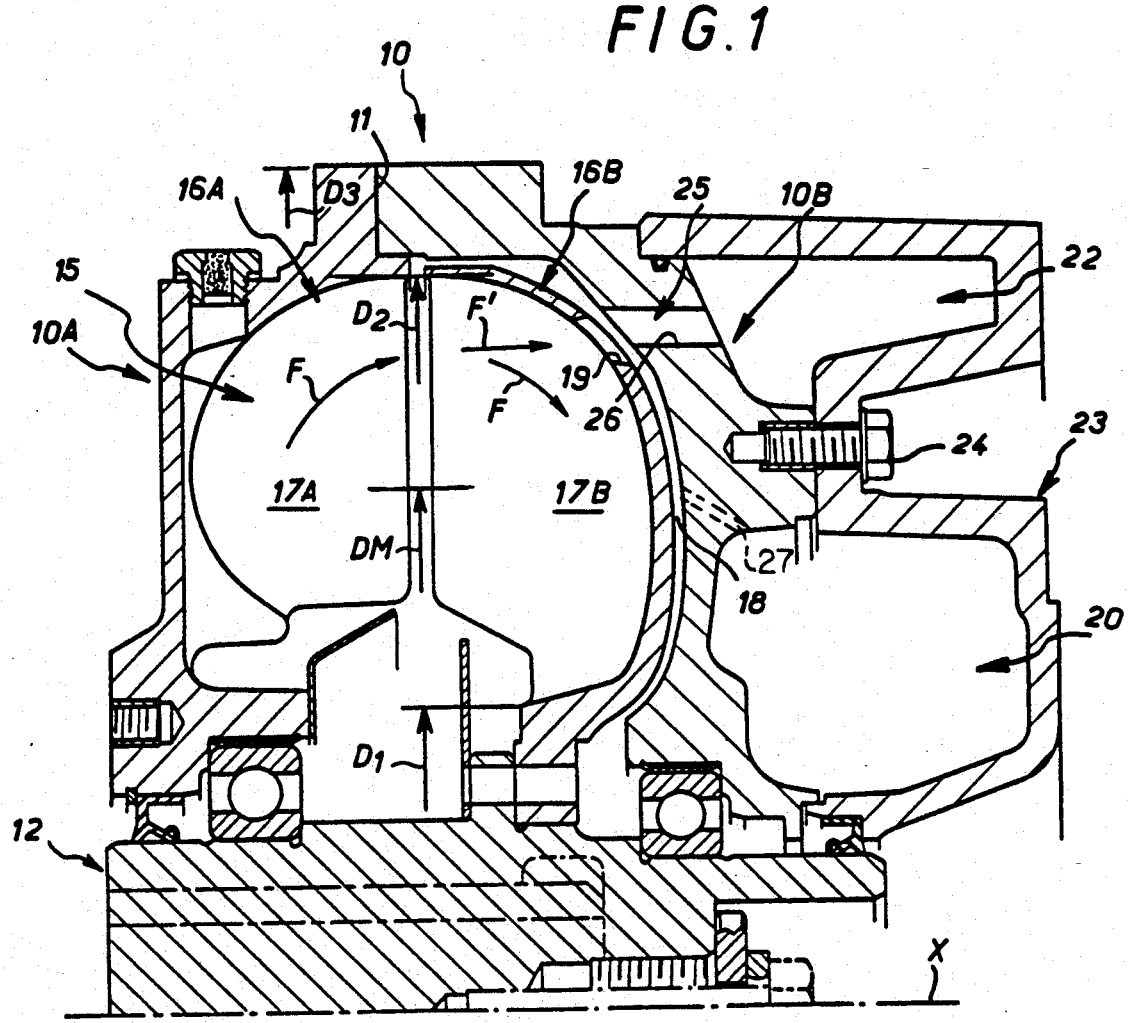
FIG. 1 is a half-view in axial cross-section of a fluid coupling in accordance with the invention.

As shown in the figures, and in a way that is known in itself, this fixed fluid capacity fluid coupling in accordance with the invention comprises an annular casing 10 formed by body and cover shells 10A, 10B fitted together face to face in a transverse sealing plane 11 and appropriately attached to each other, for example by tie-rods not visible in the figures. A hollow shaft 12 passes axially through the coupling in bearings 13.

The shaft 12 is designed to be constrained to rotate with the input shaft of the load to be driven (not shown).

It therefore forms the output shaft of the coupling.

The body shell 10A of the casing 10 is adapted to be constrained to rotate with the output shaft of any form of drive motor, also not shown.

This is usually an electric motor.

Disposed in face-to-face relationship inside the casing 10 are two members defining between them a generally toroidal working circuit 15 designed to contain a fluid (not shown), namely an impeller wheel 16A fastened to the casing 10 and forming a pump and an output wheel 16B which forms a turbine and to which the shaft 12 is fastened.

In both cases this member is an impeller-type wheel with a broadly rounded back.

The impeller wheel 16A carries vanes 17A and the output wheel 16B carries vanes 17B.

In practice the impeller wheel 16A is integral with the body shell 10A of the casing 10, its vanes 17A being carried directly by the latter in that they are integral therewith.

The same is obviously not true of the output wheel 16B which within the cover shell 10B of the casing 10 has a separate shell 18 carrying its vanes 17B.

Between its inside peripheral diameter D1 and its outside peripheral diameter D2 which defines the outside peripheral diameter of the working circuit 15 the shell 18 of the output wheel 16B usually incorporates at least one hole 19 for balancing the pressure on its opposite sides.

The hole 19, which is located between two vanes 17B, may have a circular contour, for example.

Alternatively, it may be a more or less elongate slot along a parallel or meridian line.

As shown, it is in practice in the half of the shell 18 of the output wheel 16B disposed between its mean diameter DM and its outside peripheral diameter D2, the mean diameter DM in question being defined as that half-way between the inside peripheral diameter D1 and the outside peripheral diameter D2.

Of course, a plurality of holes 19 may be provided in the shell 18 of the output wheel 16B, distributed more or less regularly in the circumferential direction, for example.

This fixed fluid capacity fluid coupling in accordance with the invention further comprises, connected to the working circuit 15 for the purpose of reducing the quantity of fluid therein on starting up, two coaxial bypass chambers which both extend annularly around the axis X of the system. These are namely a first chamber or main chamber 20 nearer the axis X and a second chamber or auxiliary chamber 22 farther from the latter.

By virtue of arrangements which are well known in themselves and which will not be described here because they are not relevant to the present invention, the main bypass chamber 20 is connected to the working circuit 15 by an offtake channel 27 situated towards the axis X and by a return channel farther from the center incorporating calibrated nozzle means.

In the embodiments shown, the main bypass chamber 20 is on the same side as the output wheel 16B and is formed between the cover shell 10B of the casing 10 and a cover 23 attached externally to the latter, for example by screws 24.

In a manner that is known in itself the auxiliary bypass chamber 22 is also connected to the working circuit 15 by an offtake channel 25.

According to the invention the offtake channel 25 uses the hole(s) 19 in the output wheel 16B.

In the embodiment shown in FIG. 1 the auxiliary bypass chamber 22 extends to the exterior of the cover shell 10B of the casing 10 and preferably faces the hole(s) 19 of the output wheel 16B, that is to say it is preferably on a diameter substantially equal to the diameter on which the hole(s) 19 lie, and the cover shell 10B incorporates at least one hole 26 contributing to the offtake channel 25.

In this embodiment the auxiliary bypass chamber 22 is in practice also disposed on the same side as the output wheel 16B and, like the main bypass chamber 20, it is formed between the cover shell 10B of the casing 10 and the cover 23 attached to the latter.

The hole(s) 26 in the cover shell 10B therefore discharge directly into it.

Given the location of the holes 19 and 26, the auxiliary bypass chamber 22 can advantageously (as here) be accommodated entirely within an overall volume whose diameter is at most of the same order of magnitude as the outside peripheral diameter of the working circuit 15 which is assumed to be defined, as already mentioned, by the outside peripheral diameter D2 of the output wheel 16B.

In reality, and it is in this sense that the expression "of the same order of magnitude as" must be understood in the context of this disclosure, the auxiliary bypass chamber 22 may extend in the radial direction slightly beyond the outer peripheral diameter D2, what is essential being that it should not extend in the radial direction as far as the outside peripheral diameter D3 of the casing 10.

It can then advantageously be fitted to a standard type casing 10 without modification to the overall diameter of the latter.

In the embodiment shown in FIG. 1 the auxiliary bypass chamber 22 lies entirely outside the main bypass chamber 20.

Its volume preferably represents a fraction, between 25% and 50%, for example, of the volume of the working circuit 15.

The fluid is preferably oil.

Be this as it may, when on starting the impeller wheel 16A driven by the associated drive motor begins to rotate the fluid in the working circuit 15 is expelled by centrifugal force to the peripheral part of the latter.

Because of the rounded shape of the impeller wheel 16A and output wheel 16B constituting the working circuit 15, there conjointly arises in the latter a vortex movement schematically represented by arrows F in FIG. 1.

Because of this vortex movement, and as schematically shown by the arrow F' in FIG. 1, some fluid is diverted from the working circuit 15 to the auxiliary bypass chamber 22 via the offtake channel 25.

Thus, like the main bypass chamber 20, the auxiliary bypass chamber 22 fills with fluid taken from the working circuit 15.

However, according to the invention, the offtake of fluid is essentially due to the vortex movement rather than centrifugal force.

It therefore occurs much more quickly and more reliably.

As a substantial amount of fluid is removed from the working circuit 15 the drive motor can advantageously start up without an excessive load and at a substantially constant torque that is significantly lower than the nominal resisting torque under steady state conditions.

Figure 2:
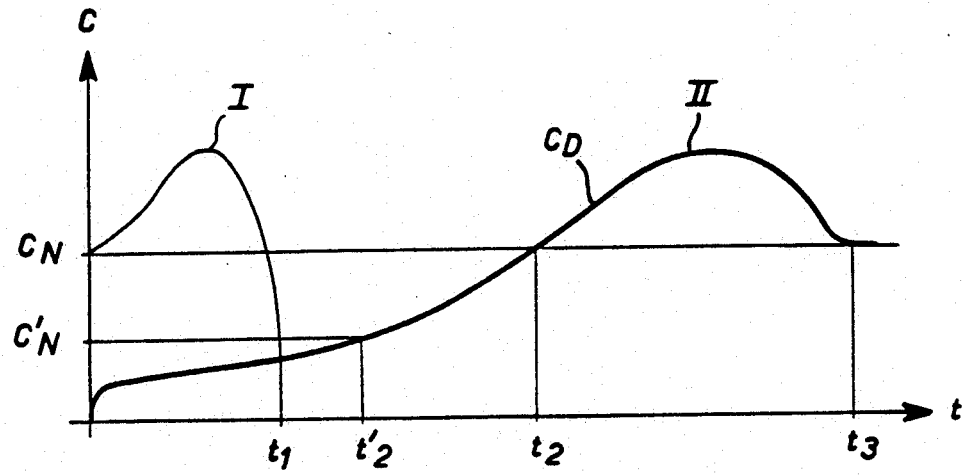
FIG. 2 is a diagram explaining how it works.

The FIG. 2 diagram is graduated in time t along the horizontal axis and in torque C along the vertical axis. The thinner line curve I is the characteristic curve of the drive motor showing the drive torque developed by it. The thicker line curve II represents the drive torque CD transmitted to the output wheel 16B and available at the output shaft 12.

At the end of a time t1 in the order of five seconds, for example, when the curve I intersects the curve II, the drive motor is synchronized.

The rotation speed and therefore the centrifugal force increasing, the fluid initially trapped by the main bypass chamber 20 is progressively returned to the working circuit 15.

The drive torque CD is therefore progressively increased.

When at a time t2 the drive torque CD equals the nominal resisting torque CN applied to the output shaft 2 the output wheel 16B, until then immobile, begins to rotate. This starts the output shaft 12 and thereby the load to be driven.

The load then accelerates until, after passing through a maximum, the drive torque CD is at time t3 again equal to the nominal resisting torque CN.

The load is then driven at its nominal rotation speed.

The time t2 is in the order of 10 seconds, for example and the time t3 in the order of 30 to 40 seconds.

In the case of starting off-load the nominal resisting torque C'N is much lower as is therefore the corresponding time t'2.

Figure 3:
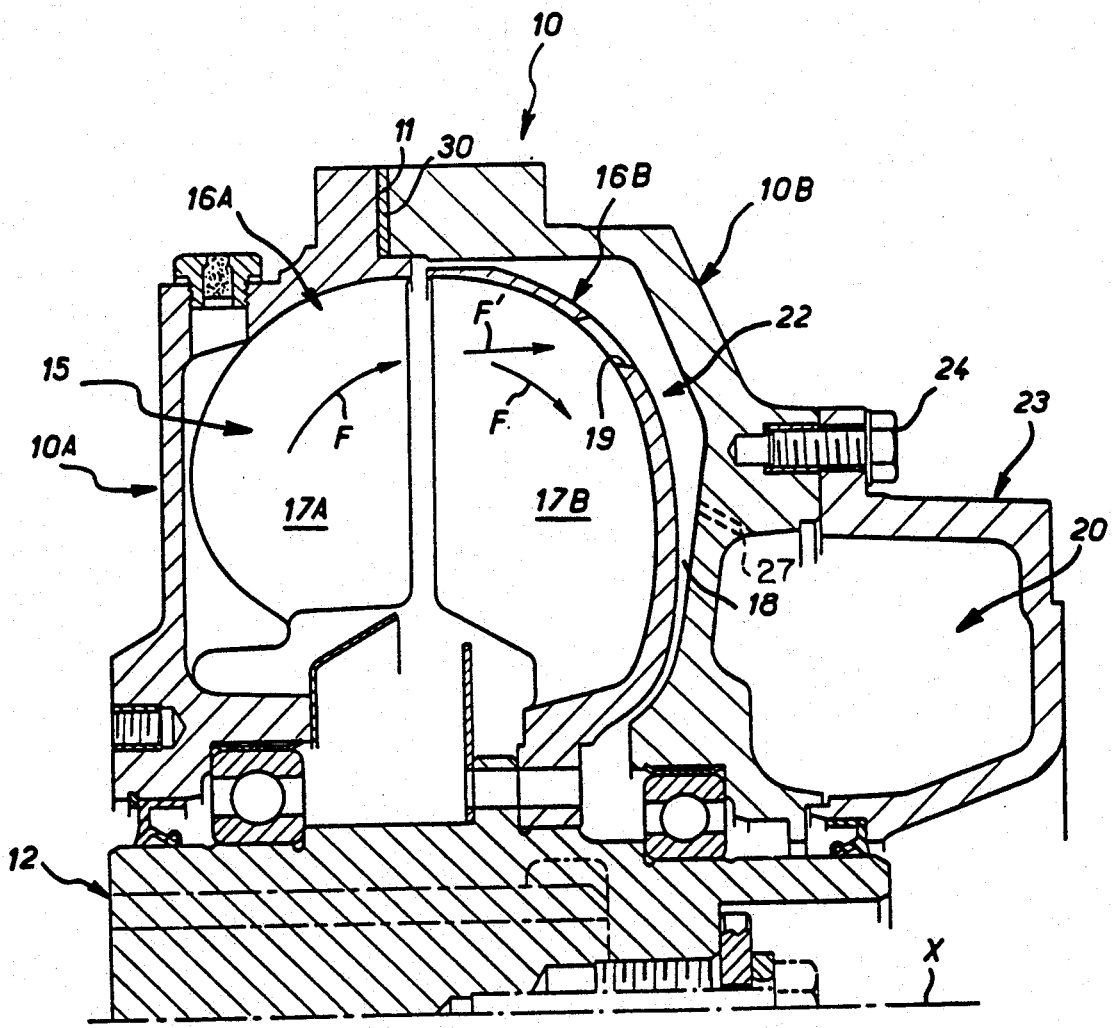
FIG. 3 is a half-view in axial cross-section similar to that of FIG. 1 but for a different embodiment.

In the embodiment shown in FIG. 3 the auxiliary bypass chamber 22 is inside the cover shell 10B of the casing 10, between the latter and the output wheel 16B.

The offtake channel 25 is therefore reduced to the hole(s) 19 in the output wheel 16B.

For example, the auxiliary bypass chamber 22 is at least in part formed by placing a shim 30 between the body shell 10A and the cover shell 10B of the casing 10 in the sealing plane 11.

However, it may equally well result at least in part from an internal deepening of the cover shell 10B.

Be this as it may, operation is the same as previously.

It will be noted that in all cases this fixed fluid capacity fluid coupling in accordance with the invention advantageously has no moving parts.

This has the advantage that its manufacture can be relatively unsophisticated.

The present invention is not limited to the embodiments described and shown but encompasses any variant execution and/or combination of their various component parts.

There is claimed:

1. Fixed fluid capacity fluid coupling comprising a casing, two members being disposed in face-to-face relationship in said casing, said members defining between each other a working circuit containing a fluid, the members extending radially in relation to an axis of the coupling, one of the members comprising an impeller wheel defining a pump and the other of the members being an output wheel defining a turbine, two bypass chambers connected to said working circuit for reducing the quantity of fluid therein upon starting up the coupling, said bypass chambers being disposed annularly around the axis of the coupling, said bypass chambers comprising a first, main chamber and a second, auxiliary chamber, offtake channels for the flow of fluid between the working circuit and each of said main and auxiliary bypass chambers and said offtake channel for said auxiliary bypass chamber including at least one hole in said output wheel radially inwardly of the outer periphery thereof, the volumetric capacity of the auxiliary bypass chamber lying substantially entirely radially inwardly of the outer periphery of the working circuit.

2. Fluid coupling according to claim 1, wherein said auxiliary bypass chamber has a volume between about 25% and about 50% of the volume of the working circuit.

3. Fluid coupling according to claim 1, wherein said casing comprises a body shell and a cover shell, said impeller wheel being fastened to sad body shell, and the cover shell surrounding said output wheel, said auxiliary chamber lying outside said cover shell.

4. Fluid coupling according to claim 3, wherein sad offtake channel for said auxiliary bypass chamber further comprises at least one hole in said cover shell facing said at least one hole in said output wheel.

5. Fluid coupling according to claim 3, wherein a cover is mounted on the cover shell and defines with said cover shell at least one of said bypass chambers.

6. Fluid coupling according to claim 1, wherein said casing comprises a body shell and a cover shell, said impeller wheel being fastened to said body shell, the cover shell surrounding said output wheel, said auxiliary chamber lying inside said cover shell between the cover shell and said output wheel.

7. Fluid coupling according to claim 6, further comprising a shim disposed axially between said body shell and said cover shell for increasing the axial spacing between said cover shell and said output wheel, and thereby the volume of said auxiliary bypass chamber.

8. Fluid coupling according to claim 1, wherein said main bypass chamber and said auxiliary bypass chamber are disposed on the same side of the fluid coupling as said output wheel.

9. Fluid coupling according to claim 6, wherein said main bypass chamber and said auxiliary bypass chamber are disposed on the same side of the fluid coupling as said output wheel, and said main bypass chamber and said auxiliary bypass chamber are formed between said cover shell and a cover secured thereto.

10. Fluid coupling according to claim 1, wherein said auxiliary bypass chamber extends slightly radially outwardly beyond the outer periphery of said working circuit.

11. Fluid coupling according to claim 5, wherein the outside periphery of said casing extends radially outwardly beyond the outside periphery of the cover.

* * * * *